United States Patent
Titli et al.

(10) Patent No.: US 8,145,235 B2
(45) Date of Patent: Mar. 27, 2012

(54) SYSTEM AND METHOD FOR ESTIMATING MOBILE WIRELESS UNIT POSITION IN A LOCALIZED AREA

(75) Inventors: Andrea Pietro Titli, Turin (IT); Michele Di Gangi, Turin (IT); Aleck Ferrari, Gabiano Monferrato (IT); Roberto Prato, Nizza Monferrato (IT); Monica Badella, Turin (IT); Fabio Forno, Salussola (IT); Andrea Carlevato, Feletto (IT); Loris Valera, Vestigne' (IT); Luca Tessitore, Caluso (IT); Giovanni Malnati, Turin (IT); Giuseppe Portelli, Santa Croce Camerina (IT)

(73) Assignees: Fondazione Torino Wireless, Turin (IT); Instituto Superiore Mario Boella Sulle Tecnologie Dell'Informazione E Delle Telecomunicazioni, Turin (IT)

( * ) Notice: Subject to any disclaimer, the term of this patent is extended or adjusted under 35 U.S.C. 154(b) by 1091 days.

(21) Appl. No.: 11/917,687

(22) PCT Filed: Jun. 16, 2006

(86) PCT No.: PCT/EP2006/063279
§ 371 (c)(1),
(2), (4) Date: Dec. 14, 2007

(87) PCT Pub. No.: WO2006/134164
PCT Pub. Date: Dec. 21, 2006

(65) Prior Publication Data
US 2008/0214203 A1  Sep. 4, 2008

(30) Foreign Application Priority Data

Jun. 17, 2005  (EP) .................................. 05013154

(51) Int. Cl.
*H04W 24/00*  (2009.01)
*H04M 11/04*  (2006.01)
(52) U.S. Cl. ............... 455/456.1; 455/404.2; 455/456.2; 455/456.5; 455/456.6
(58) Field of Classification Search ................... 455/456
See application file for complete search history.

(56) References Cited

U.S. PATENT DOCUMENTS 5,831,575 A * 11/1998 Gu ........................... 342/357.31
(Continued)

FOREIGN PATENT DOCUMENTS
EP  1263255 A  12/2002
(Continued)

OTHER PUBLICATIONS

Korean Non-Final Office Action for Application No. KR 10-2008-7001293; Issued on Nov. 24, 2009; 13 pages [translation attached].

(Continued)

*Primary Examiner* — Marivelisse Santiago Cordero
*Assistant Examiner* — Natasha Cosme
(74) *Attorney, Agent, or Firm* — Schwabe, Williamson & Wyatt, P.C.

(57) ABSTRACT

A local positioning system comprises a plurality of sensor elements that may communicate with mobile units in a wireless fashion. The responsiveness of the mobile units is measured by yes/no answers and averaged so as to provide a measure of the distance of a mobile unit to a specified sensor element. Based on this measure and the known positions of the sensor element, the position of the mobile unit is estimated, for instance by a model of ideal springs.

35 Claims, 2 Drawing Sheets

U.S. PATENT DOCUMENTS 7,194,273 B2 * 3/2007 Vaudreuil ............... 455/456.3
7,725,288 B2 * 5/2010 Boillot .................... 702/159

FOREIGN PATENT DOCUMENTS

| KR | 10-2001-0041081 | | 5/2001 |
| KR | 10-2005-0026533 | | 3/2005 |
| KR | 10-0964828 | A | 6/2010 |
| WO | WO 00/38460 | A | 6/2000 |
| WO | WO 2004/014096 | A | 2/2004 |

OTHER PUBLICATIONS

International Search Report and Written Opinion for Application No. PCT/EP2006/063279; Applicant: Fondazione Torino Wireless; Mailed on Sep. 29, 2006; 11 pages.

International Preliminary Examination Report for PCT Application No. PCT/EP2006/063279; Applicant: Fondazione Torino Wireless; Date of Issue: Dec. 17, 2007; 7 pages.

European Search Report for Application No. EP 05 01 3154; Applicant: Fondazione Torino Wireless; Date of Completion: Nov. 21, 2005; 2 pages.

International Search Report for PCT/EP2006/063279, filed Jun. 16, 2006.

Office Action for Application No. EP 05013154 dated Jul. 18, 2007.

Office Action for Application No. EP 05013154 dated Jul. 4, 2008.

Non-Final Office Action for CN Application No. 200680026122.1 issued May 20, 2010.

* cited by examiner

SYSTEM AND METHOD FOR ESTIMATING MOBILE WIRELESS UNIT POSITION IN A LOCALIZED AREA

CROSS REFERENCE TO RELATED APPLICATIONS

This application is a national stage filing under 35 U.S.C. §371 of International Application No. PCT/EP2006/063279, filed on 16 Jun. 2006, which claims priority to European Patent Application No. EP 05013154.9, filed 17 Jun. 2005. International Application No. PCT/EP2006/063279 was published under PCT Article. 21(2) in English. The above-referenced applications are hereby incorporated by reference in their entireties.

FIELD OF THE PRESENT INVENTION

The present invention generally relates to a method and a system for estimating the position of a wireless mobile unit and further relates to applications using positional data reflecting the position of the wireless mobile unit.

PRIOR ART

The rapid advance of microelectronic techniques has initiated the development of compact, highly efficient communication units receiving and/or transmitting information over wireless transmission channels. As a result, in many applications enhanced data connectivity and improved user mobility is offered, while at the same time user friendliness may be improved owing to missing cable connections and the like. Moreover, the wireless technology in combination with the widespread availability of the wireless connectivity in shared spaces offer countless opportunities for the provision of intelligent location based services for users of mobile devices. For example, mobile phones may be used for coarsely estimating the position of an end user, wherein the estimated positional data may then be used in sophisticated applications, such as forwarding positional data to police or fire brigades in case of an emergency indicated by activation of a specified routine within the mobile device. In other cases, positional data of a plurality of mobile units moving within a confined area, such as a building, may be required with a reasonable spatial resolution. It turns out, however, that the computation of the user position within confined areas, such as buildings and the like, is often cumbersome and errorprone and may also require specifically designed equipment on the mobile side, thereby contributing to cost and complexity of a corresponding positioning system. Moreover, conventional positioning systems designed for local area applications may not always scale well, when the number of mobile units to be tracked may become moderately high.

SUMMARY OF THE INVENTION

It is, therefore, an object of the present invention to provide a technique for estimating the position of mobile units within a locally confined area with reduced complexity and with the potential of high scalability with respect to the number of mobile units to be tracked.

In view of the problems identified above, the present invention provides, according to a first aspect, a local positioning system. The system comprises a plurality of sensor elements, each of which is located at a defined position within a confined area. Each sensor element is configured to wirelessly transmit a sequence of communication signals for a wireless mobile unit within the area to identify an acknowledge signal in response to at least some of the communication signals of the sequence from the mobile unit and to provide a digital value on the basis of a result of the identification of the acknowledged signal. The system further comprises one or more averaging units configured to receive a plurality of the digital values for each sequence and to generate an average value on the basis of the digital values for each of the plurality of sensor elements. The local positioning system further comprises a control unit connected to each of the sensor elements and the one or more averaging units, wherein the control unit is configured to receive the averaged values from the one or more averaging units and to estimate a position of the mobile unit on the basis of the averaged values and the defined positions of the plurality of sensor elements.

According to the present invention, a highly efficient positioning system for confined areas, such as buildings, and the like, is provided, wherein constraints with respect to computational resources and data processing capabilities is maintained at a low level at the mobile unit side and also at the sensor side. The mobile units available on the market for short and long range application are per se designed so as to respond to specific communication signals. For instance, a wide variety of wireless units is available for data communication with local area networks and the like, which comply with specified communication protocols, such as the bluetooth standard, thereby providing for specified responsiveness of the mobile unit upon the detection of a specified signal received at the mobile unit. In the inventive local positioning system, the responsiveness of the mobile unit, which may therefore represent in some embodiments any commercially available hardware unit without requiring specific modifications, is exploited in that a digital value is generated at each of the sensor elements so as to provide a measure for a responsiveness of the mobile unit to a communication signal. Hereby, a plurality of communication signals may be released from each sensor element in the form of a sequence so as to "test" the responsiveness of the mobile unit over a specified period of time. By means of the one or more averaging units, a plurality of averaged values are generated which may more accurately reflect the degree of responsiveness, which may be considered as the coupling strength of the mobile unit to the respective sensor element, compared to the moderately coarse digital value produced by each sensor element for one or more of the communication signals of a specific sequence transmitted by a specific sensor element. Consequently, by using these averaged values, representing the responsiveness and thus, the coupling strength of the mobile unit to the respective sensor elements, the local position of the mobile units may be determined based on the known positions of the sensor elements, while hardware and/or software resources required at the sensor side are quite modest and, wherein in some embodiments of the present invention, mobile units designed for specific wireless communication applications may be used substantially without any modification. Consequently, the local positioning system of the present invention may be put into practice without requiring any activity at the user side, except for holding the mobile unit in an activated state. For example, many of the modern mobile phone devices are equipped with hardware and software resources allowing a data communication with local area networks and thus these resources may be readily used by the inventive local positioning system without requiring any further input from the user.

In another preferred embodiment, the sensor elements of the local positioning system are further configured to transmit their communication signals within the sequence at different transmit power levels. Including the capability of sending the communication signals of a specified sequence with at least two different power levels may significantly enhance the reliability of the plurality of digital values associated with a specified sequence of communication signals, since the responsiveness of the mobile unit depends on the distance from the specified sensor element. For this reason, at a reduced transmit power level, the mobile unit may not respond, thereby indicating an increased distance compared to a sensor element that receives the acknowledge signal for a lower transmit power level. For instance, each sequence may comprise a plurality of different transmit power levels so that a frequency of receiving an acknowledged signal may reflect the distance to the respective sensor element more reliably than "enquiring" the surroundings of a specific sensor element with a substantially constant transmit power level.

In a further embodiment, the digital value is provided in the form of a sensor signal including an identification of the specific sensor element that generated the digital value. Consequently, the control unit may reliably identify the source of the digital value, thereby enabling a reliable data communication between the sensor element and the control unit without losing the correlation between each digital value and the associated sensor element. In this way, irrespective of the communication medium and channels used for providing the digital values to the control unit, and irrespective of the number of the sensor elements connected to the control unit, each digital value is associated with well defined positional coordinates so as to allow a reliable estimation of the position of the mobile unit.

In one preferred embodiment, at least some of the sensor elements are configured to transmit the sensor signals to the control unit in a wireless manner. This configuration provides high flexibility in installing the sensor elements within the confined area without being restricted to cable connections. Moreover, a wireless connection to the control unit facilitates any rearrangement of the sensor elements with respect to modifying the spatial resolution and/or the overall coverage of the confined area. In some case, it may be advantageous to provide the sensor elements, at least those sensor elements having the capability for wireless data communication, with a non-stationary power source, thereby allowing for temporarily or permanently installing a plurality of sensor elements within a building or any other confined area without requiring significant modifications in the building.

In one preferred embodiment, at least some of the sensor elements are connected to the control unit via a cable connection. In this way, a highly reliable data communication may be established between the sensor elements and a control unit, wherein software and hardware resources at the sensor side with respect to data processing and data encoding may be kept at a low level. Moreover, a power supply and other additional communication links between the sensor element and the control unit may be established on the basis of the cable connection.

In a further preferred embodiment, the sensor elements are configured to provide the digital value as a binary value. Thus, the digital values provided by the sensor elements may reflect simple "yes" and "no" answers to the communication signals transmitted by the respective sensor elements. For example, a mobile unit may respond to the communication signals transmitted by a respective sensor element, since it may be well within a range of the sensor element that allows a reliable receipt of the communication signal. In this case, each digital value associated with a respective one of the communication signals may be represented by a "1" or "0" depending on the type of logic used. Owing to an increased distance to the sensor element or due to any interferences affecting the wireless transmission channel between the sensor element and the mobile unit, the sensor element may not receive an acknowledged signal for some of the communication signals of the sequence within a predefined time period and this situation may then be reflected by a "0" or "1". Although only two different quantitative levels for estimating the coupling strength of the mobile unit to the respective sensor element are provided, thereby, however, significantly reducing complexity of software and/or hardware resources at the sensor side, the one or more averaging units may nevertheless estimate a sufficiently reliable analog or quasi-analog value, that is, a value may be provided that has a resolution or step width, which is significantly "finer" compared to the initially binary representation. In combination with sensor elements having the capability of transmitting the communication signals at different transmit power levels, the process of obtaining a meaningful averaged value of increased accuracy may even be more efficient, since hereby the sequence of binary values may implicitly bear the information with respect to the different transmit power levels, that is, the sensor elements may be configured to vary the transmit power level according to a modulation scheme that is known by the control unit and this knowledge may be exploited at the control unit so as to identify a correlation between the sequence of "1" and "0", representing the responsiveness to the sequence of communication signals transmitted at different transmit power levels.

In other embodiments, the digital value may comprise a binary value, indicating the responsiveness to a communication signal at a specified power level, and may also comprise a digital representation of the specified power level. In this case, the sensor elements may independently select a specified transmit power level, since the control unit may track each different power level used for a specified communication signal. In some embodiments, the sensor signals may be configured so as to substantially randomly vary the power level during the sequence to thereby also enhance the accuracy of the digital value even though the binary representation is used for indicating the responsiveness to each of the communication signals.

In a further embodiment, the one or more averaging units comprise a respective averaging section for each sensor element. Due to this arrangement, a high degree of reliability is achieved since each sensor element has associated therewith a respective averaging section. Depending on the hardware configuration of the respective averaging sections, previously obtained averaged values and/or currently valid averaged values may be preserved, even if a control unit and/or the associated sensor element and/or other averaging sections may temporarily exhibit an invalid operational status. In one preferred embodiment, each of the averaging sections is included in its associated sensor element. With this configuration, a high degree of reliability may be achieved while the hardware and software complexity at the control unit is significantly lowered. For example, the averaging sections may be configured as analog and/or digital low pass filters receiving the binary bit stream corresponding to the responsiveness to the transmitted communication signals. The averaged value obtained from the low pass filter may then be communicated to the control unit, which may be performed simply as an analogous signal or as a digital signal, such as a pulse width modulated signal, thereby providing high transmission efficiency without requiring complex encoding efforts.

In other preferred embodiments, the one or more averaging units are included in the control unit. Hereby, the one or more averaging units may be implemented entirely in hardware or may be implemented as a combination of software and hardware. Thereby, the complexity at the sensor side is maintained at a very low level while hardware and/or software resources, typically being available at the control unit may advantageously also be used to create the respective averaged values. Moreover, by using the hardware and/or software resources of the control unit, a variety of filter or averaging algorithms may be used, or the averaged values for a large number of sensor elements may be provided within a very short time period so as to allow to track a large number of mobile units within the confined area.

In a further preferred embodiment, the control unit comprises an estimation section for estimating the position, wherein the estimating section has incorporated therein a calculation model based on a linear relationship of a distance of the mobile unit from a specific sensor element and the averaged value associated with the specific sensor element.

Thus, by means of the estimation section having implemented therein the linear model, the calculation of the position may be performed in a highly efficient manner thereby providing the potential for estimating the positions of a plurality of mobile units within a specified time. For instance, the positions of a large number of mobile units within a public building, and the like, may be updated within a few seconds or less or so as to be able to track the positions of the mobile units with a reasonable spatial resolution for typical velocities of mobile units within a building.

In a further embodiment, the control unit is further configured to estimate the position of at least one further mobile unit within the confined area while preserving the estimated position of the mobile unit. In this way, the positional data of a plurality of mobile units may be determined and used within a specified time frame. That is, irrespective of whether the prompting of a plurality of sensor elements with respect to a specified mobile unit may be performed in a parallel or serial fashion, positional data already obtained may be preserved so as to provide an overview of all mobile units being present within the range of the plurality of sensor elements in the specified time frame. In further advantageous embodiments, the system further comprises an interface for providing the estimated position to a platform connectable to the interface. According to this configuration, the position data obtained by the local positioning system may be used for applications run at the platform so as to provide location based services. For example, in one basic application, the number of mobile units may be estimated that are present in the confined area at given time intervals.

According to a further aspect of the present invention, a service system comprises a local positioning system as is described in any of the above embodiments or in embodiments that will be described in the detailed description later on. Moreover, this service system comprises a platform connected to the local positioning system so as to receive data regarding the position of the mobile unit, wherein the platform is configured to run one or more application routines for providing position sensitive services on the basis of the data.

In a further embodiment, this service system is designed for a location based service for indoor environments. For this application, advantageously existing mobile devices being equipped with local area network communication capabilities may be used in combination with the present invention, wherein moderately low complexity at the sensor side in combination with high flexibility regarding connectivity and installation issues of the inventive system provide for an excellent overall performance.

Advantageously, the data may at least indicate entering and/or exiting of the confined area by the mobile unit. As previously pointed out, by this configuration, the number of mobile units being present in the confined area may be estimated, wherein in some embodiments, the requirements with regard to computational resources are moderately low so that a corresponding overview may be accomplished for a large number of mobile units and/or for short time intervals.

In further advantageous embodiment, the system further comprises indication means for indicating service information that is produced by one or more applications. Hence, service information may be provided in a highly selective fashion based on the positional data, wherein acoustic, optic, or any appropriate indication means may be used to deliver the service information to a user. Advantageously, the indication means are configured to provide the service information in a localized manner.

In an advantageous embodiment, the indication means comprises a communication unit that is configured for wireless data transfer to the mobile unit. In this case, any service information may be communicated with high selectivity, whereby, depending on the type of mobile unit used, the communication hardware of those sensor elements may advantageously be used, which are determined to be closest to the mobile unit, thereby enhancing data transfer efficiency.

According to still a further aspect of the present invention, a method of estimating a position of a wireless mobile unit is provided. The method comprises transmitting from each of a plurality of defined transmit positions arranged within a confined area, a respective sequence of communication signals. Then, a responsiveness of the mobile unit to each sequence of communication signals is evaluated by a digital value established for at least some communication signals in each sequence. Moreover, digital values associated with a respective one of the sequences is averaged to generate an average value for each sequence of communication signals and finally, position data for the wireless mobile unit is determined on the basis of the averaged values and the defined transmit positions.

As previously stated, the present invention enables the creation of meaningful positional data on the basis of pure digital information with respect to the presence of a mobile unit in the vicinity of a sensor element. Based on the digital value, which is averaged, for instance by a digital low pass filter, the positional data may then be obtained with a spatial resolution in conformity with the number and spacing of the transmit positions used. Hereby, the sensor elements may be configured so as to "inquiry" the environment in a substantially continuous manner, i.e. each sequence transmitted from a respective sensor element may include a large number of communication signals, thereby allowing a substantially continuous tracking of mobile units in the vicinity of a specified sensor element. In other case, the sensor element may be controlled to transmit the communication signals in any desired time pattern as is considered appropriate for containing the desired positional data with a minimum of transmit power. Consequently, based on yes-no information for each pair of sensor element/mobile unit estimates of the position thereof may be obtained with a spatial resolution that depends on the plurality of the sensor elements within the confined area.

Advantageously, the inquiry of the sensor elements by means of the communication signals is performed at different transmit power levels, whereby mobile units located very near to the sensor element will tend to respond substantially always, while units father apart will tend to respond only when a higher transmission power is employed. Hence, the averaged value obtained on the basis of digital numbers crated by different transmit powers may reflect the distance between a respective sensor element and the mobile unit more precisely compared to providing the communication signals with a constant transmit power.

In a further advantageous embodiment, determining the position data comprises: considering each averaged value of a respective sequence associated with a respective transmit position as a measure of a distance of the mobile unit from the respective transmit position; obtaining the distance from each transmit position on the basis of the respective averaged values; and estimating a position of the mobile unit on the basis of the distances.

In one advantageous embodiment, determining the positioning data is performed on the basis of a model of ideal springs connecting the mobile unit with each of the transmit positions. In this case, a highly efficient and fast computation of the positional data is accomplished, thereby providing the potential for tracking a large number of mobile units within the confined area, wherein updating of the positional data is possible within any time frames associated with position changes that are typical for slowly moving mobile units as are, for example, carried by pedestrians.

In a further embodiment, the method further comprises determining a desired spatial resolution for tracking the mobile unit within the confined area, selecting a number and position of the defined transmit positions on the basis of the determined spatial resolution and positioning at least one position sensor at each of the plurality of transmit positions. Consequently, the position of the position sensors and thus, the performance of the local positioning system may be adapted to the application under consideration. For example, if substantially a yes/no information on the presence of a mobile unit within the confined area as desired, a corresponding "net" of sensor elements may be positioned at any entrances or exits of the confined area, whereas the interior may be substantially void of any sensor elements. Moreover, the spatial resolution may depend on the specifics of the confined area, such as architecture of the building, type of material used, such as thick walls and the like, number of visitors to be expected. Consequently, the positions of the sensor elements may be selected in conformity with these conditions and may also be adapted to the hardware configurations of the mobile units so as to enhance the overall efficiency of the system. In this way, the spatial resolution may be selected to approximately 10 meters or significantly less, such as approximately 2 meters or less, which may suffice for a wide variety of location based services in indoor environments.

Advantageously, a location based service may be provided by receiving the position data and providing information based on the position data. Consequently, information may be generated on the basis of extremely localized positional data and/or information provided by one or more applications may be supplied in a highly selective fashion, wherein the information may directly be presented in the vicinity of the mobile unit under consideration or may be provided in a way that the user of the mobile unit under consideration becomes aware of the information that is specifically relevant for his/her position.

Further advantageous embodiments, objects and advantages of the present invention are described in the appended claims and in the following detailed description, which may be studied in combination with the accompanying drawings so as to obtain a further standing of the present invention.

DETAILED DESCRIPTION OF THE INVENTION

The architecture of the local positioning system is configured such that sensor devices search for mobile units in the surrounding space, thereby broadcasting inquiry packets, in preferred embodiments at different power levels, and listening for response. The collected responses are sent to a control unit in a form that allows the control unit to identify the respective sensor device that sends a specified inquiry report. The data transmission between the sensor devices and the control unit may be performed by any appropriate network connection including wireless and/or wired transmission channels. The information reported by a given sensor device with respect to one or more specific mobile units is digital in nature, that is, at any given time a mobile unit may either be reachable and thus responds to the inquiry packet or may not be reachable and thus does not respond to the inquiry packet. These elementary pieces of information are first converted into values of increased accuracy by averaging a plurality of digital information for any given sensor element/mobile unit pair. Finally, the average value of increased accuracy is converted into appropriate coordinates with a desired degree of precision which may be in the range of approximately 10 meters or significantly less such as one or two meters for typical indoor applications.

Figure 1A:
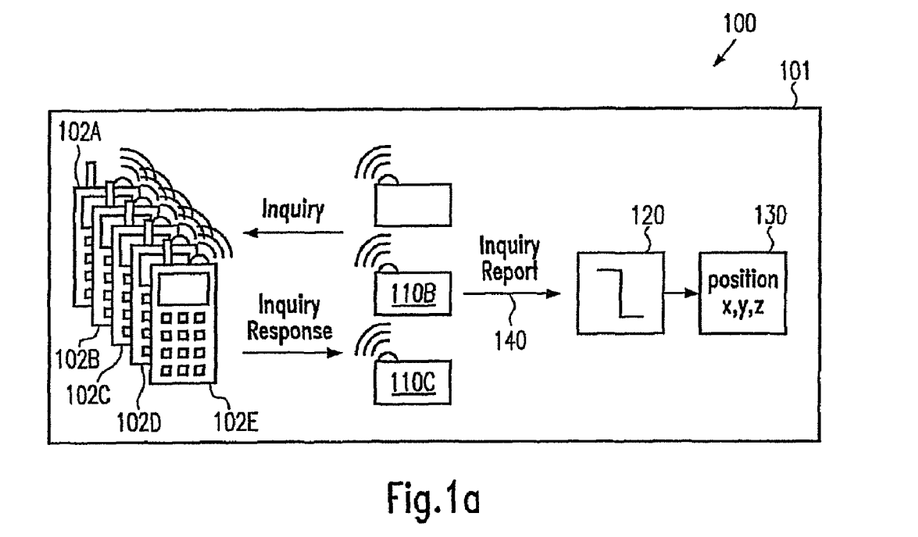
FIG. 1a schematically shows a local positioning system according to illustrative embodiments of the present invention.

FIG. 1a schematically shows a local positioning system 100 in accordance with the present invention. The system 100 comprises a plurality of sensor elements 110a, . . . , 110c appropriately positioned in a confined area 101. The sensor elements 110a, . . . , 110c are configured to wirelessly transmit a sequence of communication signals conforming to an appropriate transmission protocol. For example, the sensor elements, 110a, . . . , 110c may have incorporated therein any appropriate output module for sending a communication signal in a timely controlled fashion, wherein the communication signal conveys any information that is required for initiating a response of an appropriately equipped mobile unit 102a, . . . 102e. For example, the sensor elements 110a, . . . 110c may comprise a transmitter section that is compatible with a conventional local area network protocols such as the bluetooth standard. It should be appreciated, however, that any other wireless communication technique may be used in the sensor elements 110a, . . . 110c, as long as the mobile unit 102a, . . . 102e are equipped with corresponding transceiver sections to respond to the communication signals transmitted by the sensor elements 110a, . . . 110c. When the sensor elements 110a, . . . 110c are configured to transmit communication signals in compliance with a standard transmission protocol such as the bluetooth standard, advantageously location based services may be provided to the mobile units 102a, . . . 102e without requiring any modification of these mobile units or even without requiring any side information or activity at the user end, as long as the mobile units 102a, . . . 102e are activated as is typically the case for mobile phones. It should also be emphasized that the sensor elements 110a, . . . 110c may be configured to provide communication signals in compliance with two or more different transmission protocols so as to allow the communication with mobile units of different configuration. In other embodiments, the mobile units 102a, . . . 102e may be a part of the system 100 in that these mobile units may represent specifically designed devices that may be accessible by an end user upon entering the confined area 101. In preferred embodiments, the sensor elements 111a, . . . 110c are configured to enable the transmission of the respective communication signals at different power levels. That is, at least some of the sensor elements 110a, . . . 110c may enable a transmission of communication signals of a specified sequence at two or more different transmit power levels. Hereby, the transmit power levels may be varied randomly or according to a specified pattern. For instance, within a specified sequence, that is a specified number of communication signals, including specific "listening" periods, each transmit power may be used equally frequently, wherein the duration of the entire sequence is moderately low compared to a time required by a typical velocity of the mobile unit within the confined area 101 to move a predefined distance.

The sensor elements 110a, . . . 110c are operatively connected to averaging means 120, which in turn is operatively connected to a control unit 130. The averaging means 120 is configured to receive a plurality of digital values for each pair of a mobile unit 102a, . . . 102e and a respective sensor element 110a, . . . 110c and to provide for each mobile unit/sensor element pair an averaged value having an increased precision compared to the received digital values. For example, the digital values for each mobile unit/sensor element pair may be received in the form of a sequence of binary values, indicating the responsiveness of a mobile unit associated with the respective mobile unit/sensor element pair, wherein a sequence of binary values may include or may be preceded by an appropriate identification, enabling the averaging means 120 to assign a dedicated averaging section or channel to the respective mobile unit/sensor element pair. Advantageously, the averaging means 120 comprises hardware resources that enable the receipt of the digital values and the processing of these values in a digital fashion so as to provide the averaged value for each mobile unit/sensor element pair. For instance, the averaging means 120 may comprise software resources so as to act as a digital low pass filter, wherein a plurality of digital sequences received from the respective sensor element 110a, . . . 110c may be processed in parallel or sequentially, depending on the hardware configuration of the averaging means 120. Typically, the computational resources of the averaging means 120 are sufficient so as to process a plurality of digital sequences sequentially without significantly contributing to any performance loss, as the speed of data processing is significantly higher compared to the rate of providing the digital values for the respective mobile unit/sensor element pair.

In some illustrative embodiments, the averaging means 120 may be provided as distinct devices so that at least some of the sensor elements 110a, . . . 110c have included therein respective averaging sections. For example, some of the sensor elements 110a, . . . 110c may be equipped with hardware resources that allow the configuration of a variable or fixed number of averaging channels, wherein the capacity of averaging channels may be selected in conformity with system requirements. Thus, if a certain maximum number of mobile units 102a, . . . 102e is expected to be in the vicinity, that is within the range of one or more of the sensor elements 110a, . . . 110c, the hardware and/or software resources may be selected so as to offer a number of averaging channels corresponding to this maximum number of mobile units that may gather in the vicinity of the respective sensor elements. Consequently, the sensor elements 110a, . . . 110c, having incorporated therein respective averaging sections, may provide respective values corresponding to the number of mobile units within the range of the respective sensor elements and may then communicate the respective averaged values to the control unit 130. As a consequence, instead of transmitting a plurality of digital values for each mobile unit/sensor element pair to the averaging means 120, merely the averaged value for each mobile unit/sensor element pair has to be communicated to the control unit 130, thereby reducing requirements with respect to the data transmission from the sensor elements 110a, . . . 110c to the control unit 130. In other embodiments, the averaging means 120 may be included in the control unit 130, thereby taking advantage of the hardware and software resources provided by the control unit 130. The control unit 130, in turn, is configured so as to calculate an estimate of the positions of the mobile units 102a, . . . 102e on the basis of the averaged values supplied by the averaging means 120 for each of the mobile unit/sensor element pair and on the basis of the positions of the sensor elements 110a, . . . 110c.

Moreover, the data communication from the sensor elements 110a, . . . 110c to the averaging means 120 and/or to the control unit 130 may be accomplished by any other appropriate network 140, which may include one or more suitable transmission channels. In illustrative embodiments, the data communication network 140 connecting to the averaging means 120 and/or the control unit 130 may be established on the basis of a wireless communication channel, thereby exploiting the radio frequency or optical communication capabilities of the sensor units 110a, . . . 110c. In other embodiments, when data integrity and/or electro-magnetic interferences are considered an important aspect, the data communication 140 may be provided by a cable connection, such as in the form of metallic conductors, optical fibers and the like. It should be appreciated that the spatial resolution, that is the accuracy in position achievable by the system 100, essentially depends on the number of sensor elements 110a, . . . 110c and their specific positions within the confined area 101. Thus, installing the system 100 within a given confined area 101, such as public buildings, a mall, a hospital, an airport, a railway station, and the like, may require a reconfiguration of the sensor elements and/or the addition of further sensor elements so as to enhance the overall performance of the system 100. In this case, it may be advantageous to provide at least some of the sensor elements 110a, . . . 110c in the form of portable units, preferably with wireless communication capabilities so as to communicate with the average means 120 and/or the control unit 130, wherein in some advantageous embodiments, a power supply is incorporated in the portable sensor elements. In this case, a high degree of flexibility in adapting the configuration of the sensor elements 110a, . . . 110c, that is, the position and number of the sensor elements, to the specifics of the confined area 101.

Figure 1B:
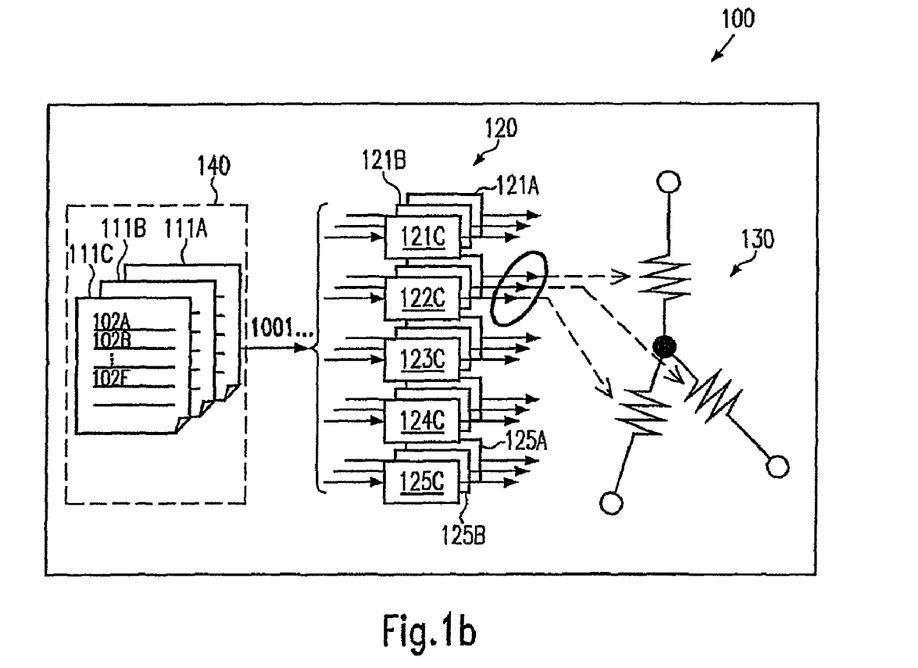
FIG. 1b schematically shows a portion of the local positioning system in more detail.

With reference to FIG. 1a and FIG. 1b, the operation of the system 100 will now be described in more detail. After having properly installed the plurality of sensor elements 110a, . . . 110c, thereby creating and storing respective positional data for each of the sensor elements 110a, . . . 110c in the control unit 130, the confined area 101 may be searched by the sensor elements 111a, . . . 110c in that each of these devices transmits a sequence of communication signals, wherein after the transmission of each communication signal, the sensor elements wait for a response to each of the communication signals. For instance, each of the sensor elements 110a, . . . 110c may transmit a data packet corresponding to a specified communication protocol such as the bluetooth standard, wherein this data packet is identified by any mobile unit 102a, . . . 102e being within the range of one or more of the sensor elements 110a, . . . 110c. It may be advantageous to synchronize at least to a certain degree, the transmission of the communication signals from the individual sensor elements so as to reduce a possible interference of different communication signals received by the same mobile unit 102a, ... 102e. For example, the sensor elements or at least some neighboring elements may be operatively connected with each other by a network configuration so as to transmit respective communication signals with a slight time delay to each other, thereby avoiding the arrival of two or more communication signals of different sensor elements 110a, ... 110c at a specific mobile unit at the same time, thereby possibly blocking the mobile unit for data communication to one or more of simultaneously transmitting sensor elements. As soon as one or more of the mobile units 102a, ... 102e is within the range of one or more of the sensor elements 110a, ... 110c, a response may be sent to each of the inquiring communication signals to acknowledge the receipt of the originally sent communication signal. Since preferably the acknowledgment of the receipt of a communication signal of a specific sensor element may include an identification of the corresponding mobile unit 102a, ... 102e, the response, that is yes/no information, may be communicated to the averaging means 120 along with an identification of the specific mobile unit. In some advantageous embodiments, the transmission of a sequence of communication signals of the sensor elements 110a, ... 110c may be performed with varying power levels so that any mobile unit being positioned farther apart from a specific sensor element tends to respond less compared to a mobile unit that is positioned closer to the specific sensor element. Consequently, a mobile unit closely positioned to a respective sensor element may generate a sequence of yes/no answers including significantly more-yes answers compared to a mobile unit being positioned farther apart from the specific sensor element. In other embodiments, the yes/no information may be reported to the averaging means 120 together with a respective value indicating the transmission power level, at which a respective yes/no information has been created by a respective mobile unit. Based on the digital values received from the plurality of sensor elements 111a, ... 110c, the average means 120 generates a respective averaged value for each mobile unit/sensor element pair, which presents the distance for each of these pairs. As previously noted, the number of averaged values depends on the number of mobile units within the confined area 101 and the averaging means 120 typically comprises sufficient resources, hardware and software resources, so as to calculate and maintain the corresponding number of averaged values. It should be appreciated, that the digital values from the sensor elements 110a, ... 110c may be applied to the averaging means 120 in the form of data packets, as individual values or any other appropriate data format. For example, after a first acknowledgement by one of the mobile units in response to one of the communication signals of the sensor elements, the averaging means 120 may establish a respective "data channel", which may then be reserved as long as the specific mobile unit responds to the specific sensor element. The sensor elements 110a, ... 110c search their environment by sending out a sequence or sequences of communication signals to query their environment in respect of the presence of any of the mobile units 102a, ... 102e. In the following, it may be assumed that each of the mobile units 102a, ... 102e responds at least to some of the communication signals transmitted by each of the sensor elements 110a, ... 110b, thereby indicating their presence within the transmission range of the sensor elements 110a, ... 110c, which, as previously stated, may query their environment on the basis of communication signals sent at different power levels. Upon detecting, that is, receiving a response for one of the communication signals along with appropriate identification of the responding mobile units, each of the sensor elements 110a, ... 110c may establish an "inquiry report" including an identification of each mobile unit having responded to at least one of the communication signals and a digital representation of the responsiveness. For example, a corresponding inquiry port of each of the sensor elements 110a, ... 110c may include a sequence of yes/no answers for each of the mobile units 102a, ... 102e responding to the sequence of communication signals of each of the sensor elements 110a, ... 110c.

FIG. 1b schematically shows three inquiry reports 111a, ... 111c as may be created by the respective sensor elements 110a, ... 110c. Thus, each of the inquiry reports 111a, ... 111c includes five "information channels" associated with the respective mobile units 102a, ... 102e in the present example. It should be appreciated that some of the inquiry reports may include more or less information channels, depending on the number of mobile units detected by each of the sensor elements 110a, ... 110c. For example, a new information channel may be established in the inquiry report 111c as soon as the presence of a new mobile unit is detected by the sensor element 110c for the first time. Similarly, one or more of the information channels may be "deleted", as soon as a previously identified mobile unit continues to not respond to the communication signals of a specified sensor element. It should be appreciated that the establishment or deletion of an information channel may be considered as a virtual concept in that simply the data rate communicated to the averaging means 120 is correspondingly increased or decreased. That is, upon continuously not detecting a response for a previously acknowledged mobile unit, the yes/no information, along with the respective identification, may simply be excluded from the data stream transmitted to the averaging means 120. Similarly, a newly detected mobile unit may be integrated into the data stream to the averaging means 120. In other embodiments, a specified information channel may actually be created upon the detection and the yes/no information along with an identification may be transmitted to the averaging means 120 as long as the identification is finally discarded at the sensor side.

After receiving the inquiry report 111a, ... 111c in the averaging means 120, which is shown in FIG. 1b as including a low pass filter matrix having filter channels 121a, ... 125a, 121b, ... 125b, and 121c, ... 125c, which correspond to the information channels of the respective inquiry reports and which are designed to create from the digital values, for instance provided as yes/no information, respective averaged values, representing the distance of each of the mobile units 102a, ... 102e from the respective sensor elements 110a, ... 110c. For example each of the filter channels 121a, ... 125c may include, as a simple example, a counter and a divider so as to obtain an averaged value on the basis of a ratio of yes answers compare to the total number of inquiries. Upon receiving updated yes/no information, the respective averaged value may also be updated, thereby reflecting the tendency of a change in distance of each of the mobile units 102a, ... 102e from the respective sensor elements 110a, ... 110c. It should be appreciated, however, that any other averaging mechanisms and algorithms may be applied. For instance, a moving average algorithm may be used, in which the most recent digital values are weighted more strongly than earlier yes/no information. Although providing the filter channels 121a, ... 125c as digital units comprising software resources, simple analogous low pass filters may be used, such as an RC filter element, the output of which may then be digitized so as to provide an appropriate averaged value for the further processing within the control unit 130.

In FIG. 1b, the control unit 130 may have incorporated therein a model for obtaining positional data on the basis of the averaged values provided by the filter channels 121a, ...

125c. In the model shown, the distance between a respective mobile unit 102a, . . . 102e may linearly depend on the averaged value provided by the respective filter channel of the averaging means 120. In one illustrative example, this linear dependency may be based on a spring-model, wherein the averaged values may represent the elastic coefficient of the corresponding ideal spring in the model. Thus, if for instance, the responsiveness a specific mobile unit is coded as a "1" while failing to respond to a communication signal may be indicated as a "0", a higher averaged value provided by the average means 120 indicates an increased elastic coefficient and, thus, implies a reduced distance of the respective mobile unit from the respective sensor element. Hereby, the control unit 130 may model the mobile unit as a point in space connected to involved sensor elements by an ideal spring. The position of the mobile unit is then assumed to be that position, in which all forces applied to it are in equilibrium, which may then readily be computed by the control unit 130 so as to provide respective positional data. It may be preferable to provide the positional data as coordinates, which allow the usage of the positional data for a wide variety of applications. In other embodiments, the positional data provided by the control unit 130 may represent information on the vicinity to a certain point of interest. For example, positional data may be provided, which reflect the vicinity to any of the sensor elements 110a, . . . 110c or which identifies that sensor element, which is closest to the mobile unit under consideration. It should be appreciated that using the above identified model, the information included in the inquiry reports 111a, . . . 111c is respected. If a mobile unit responds to a given sensor element, this means that it is inside its range, which is reflected by the fact that the corresponding filter channel supplies an increased averaged value, thereby implying that the respective spring becomes stiffer, thus pulling the mobile unit toward the respective sensor element. On the contrary, if a mobile unit does not respond to a communication signal, it does not automatically mean that it is out of range as environmental noise could have disturbed the communication. Based on this model, this type of lost information is taken into account by a spring that becomes weaker—in the limit case, the spring is infinitely extensible—but never pushes away any of the mobile units. The model of ideal springs is highly efficient in obtaining reliable positional data with minimal computational resources, thereby offering the potential of determining the position of a large number of mobile units within the confined area 101 in a reasonable time period. For example, within a few seconds or less, positional data may be obtained for mobile units representing visitors of public buildings, shopping malls and the like.

In other embodiments, a different model may be used so as to calculate the positions of the mobile units. For example, the averaged values provided by the averaging means 120 may represent the intensity of the transmit power and may be considered as being inverse proportional to the square of the distance, assuming a substantially isotropic emission of the communication signals. Based on these assumptions, corresponding distances may be calculated and may then be used, in combination with the known positions of the sensor elements, to obtain respective positional data for each of the sensor elements.

Figure 2:
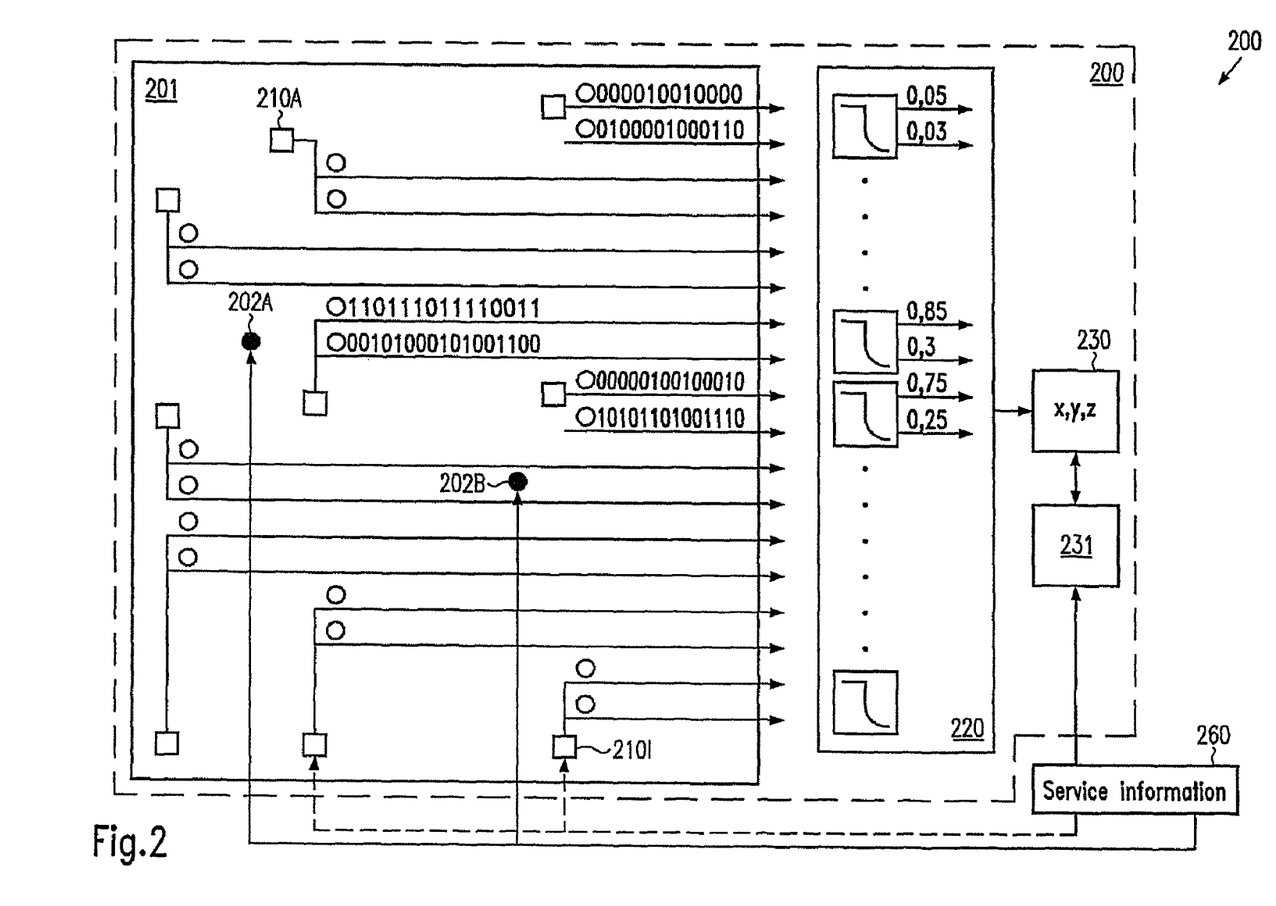
FIG. 2 schematically shows a location based service system in accordance with the present invention.

FIG. 2 schematically shows a location based service system 250, which may include a local positioning system 200 that may be configured similarly as is described with reference to FIGS. 1a and 1b. Thus, the local positioning system 200 may comprise a plurality of sensor elements 210a, . . . 210i positioned at well defined locations within a confined area 201. The sensor elements 210a, . . . 210i are configured to communicate with averaging means 220, which in turn is operatively connected to a control unit 230 configured to establish positional data on the basis of the averaged values supplied by the averaging means 220 and the well known positions of the sensor elements 210a, . . . 210i. Moreover, the local positioning system 200 comprises an interface 231 connected to the control unit that is configured to enable data communication of the local positioning system 200 with an outside information source 260, which may be configured to provide service information on the basis of the positional data received via the interface 231. In the example shown, two mobile units 202a, 202b are currently present within the confined area 201 so that the sensor elements 210a, . . . 210i may deliver respective digital values, for instance yes/no information for each of the mobile units 202a, 202b to the averaging means 220, which has established therein a corresponding number of filter channels so as to provide respective averaged values to the control unit 230. The positional data calculated by the control unit 230 may be provided to the information source 260, which may then provide service information on the basis of the positional data. For instance, the information source 260 may represent indication means so as to indicate in any appropriate fashion information that is relevant for the mobile units 202a, 202b in view of their current positions within the confined area 201. The information source 260 may, in some embodiments, be connected to the confined area 201 so as to receive information on the status of the confined area 201, which may then be used in combination with the positional data to generate a respective service information for both of the mobile units 202a, 202b. For example, the confined area 201 may represent a production area for which the information source 260 may assess the current status, for instance in view of any abnormal conditions. Upon detection of any local event requiring the attention of an operator, that operator being closest to the event under consideration, may be notified based on the positional data delivered by the local positioning system 200.

In other scenarios, simply the number of visitors or mobile units may be monitored for any given point of time. Moreover, upon entering the confined area 201, the mobile units may be supplied with any informative messages so as to assist the carriers of the mobile units in performing their tasks within the confined area 201. In other situations, such as shopping malls and other shared spaces, the information source 260 may provide information so as to enable interaction of mobile units with each other and/or with nearby resources. For instance, employees of shopping malls may easily be identified by a user who is supplied with the information from the source 260.

In some embodiments, the information provided by source 260 may be communicated to the mobile units 202a, 202b in a highly localized fashion so that this information may be used by the specific mobile unit 202a, 202b, for which the information is of special interest. Hereby, the wireless communication capabilities of the sensor elements 210a, . . . 210i may be exploited in that the information as communicated to one of the sensor elements, for example to the sensor element being closest to the respective mobile unit, from which the information may then be transmitted to the mobile unit in a wireless fashion.

As a result, the present invention provides a local positioning system and a location based service system, which may, in some embodiments, not require the presence of any positioning specific piece of software on the mobile side, thus allowing the usage of custom, off the shelf devices. The spatial resolution of the local positioning system may be brought to a desired level by suitably placing wireless sensor element across the confined area of interest, whereby moderately low computational resources are required in the sensor elements, wherein even the wireless communication capabilities may be exploited so as to convey information to the averaging means or control unit, thereby allowing low cost, large scale deployment. In preferred embodiments, the positioning algorithm implemented in the control unit allows, for its simplicity and robustness, that a very large number of positions may be computed per second, thereby making the architecture suitable for densely populated structured buildings, such as airports, malls, and the like.

The invention claimed is:

1. A local positioning system, comprising:
   one or more averaging units configured to receive multiple sequences of digital values that represent whether or not acknowledgements from a mobile device to respective inquiries from respective transmitters of a plurality of transmitters were received and to generate an averaged value for each of said sequences digital values; and
   a control unit communicatively coupled to said one or more averaging units, configured to receive said averaged values from said one or more averaging units, said control unit being further configured to estimate a position of said mobile device based at least in part on said averaged values and on defined locations associated with the transmitters of the plurality of transmitters.

2. The local positioning system of claim 1, further comprising:
   the plurality of transmitters, configured to transmit said inquiries at varying power levels.

3. The local positioning system of claim 1, wherein the one or more averaging units are further configured to receive information that correlates the sequences of digital values to the respective transmitters.

4. The local positioning system of claim 3, wherein said acknowledgements include identifiers of the mobile device, and said plurality of sequences of digital values include said identifiers.

5. The local positioning system of claim 3, wherein said control unit is further configured to receive said sequences of digital values via a wireless channel.

6. The local positioning system of claim 1, wherein said control unit is further configured to receive said sequences of digital values via a cable connection.

7. The local positioning system of claim 1, wherein said sequences of digital values are sequences of binary values.

8. The local positioning system of claim 1, wherein said one or more averaging units are configured to low pass filter the sequences of digital values.

9. The local positioning system of claim 1, wherein said control unit is further configured to estimate another position of another mobile device.

10. The local positioning system of claim 1, further comprising an interface configured to provide said estimated position to a location-based service.

11. A method of estimating a location of a wireless device, comprising:
    transmitting, from a plurality of transmitters located at defined locations of a first area, respective sequences of inquiries;
    receiving, from the wireless device, acknowledgements to at least some of the inquiries transmitted from at least some of the transmitters;
    determining, for each sequence of inquiries, a responsiveness of the wireless device to the particular sequence of inquiries based at least in part on a sequence of digital values that represents whether or not acknowledgements were received for each inquiry of the particular sequence of inquiries, including:
        generating, for each sequence of inquiries, an averaged value based at least in part on averaging the digital values of the particular sequence of digital values; and
    estimating the location of the wireless device based at least in part on the averaged values and the defined locations.

12. The method of claim 11, wherein said transmitting the respective sequences of inquiries includes:
    transmitting a first inquiry of a first sequence of inquiries at a first transmit power; and
    transmitting a second inquiry of the first sequence of inquiries at a second transmit power, wherein the first transmit power is different than the second transmit power.

13. The method of claim 11, wherein the sequences of digital values are sequences of binary values.

14. The method of claim 11, wherein said determining the responsiveness of the wireless device to the particular sequence of inquiries at a location different from the defined locations.

15. The method of claim 11, further comprising:
    transmitting the sequences of digital values to a remote control unit.

16. The method of claim 11, further comprising
    transmitting the sequences of digital values to a remote control unit via a wireless transmission channel.

17. The method of claim 11, wherein said estimating the location of the wireless device includes:
    estimating distances of the wireless device from the defined locations based at least in art on averaged values generated from the sequence of inquires transmitted from the respective transmitters.

18. The method of claim 17, wherein said estimating the location of the wireless device is based at least in part on an ideal springs analysis.

19. The method of claim 11, further comprising:
    providing the estimated location of the wireless device to a location based service.

20. The method of claim 19, further comprising:
    receiving, by the location based service, the estimated location of the wireless device; and
    providing, by the location based service to the wireless device, information based at least in part on the received estimated location.

21. The method of claim 20, wherein the received estimated location is indicative of entry of the wireless device into the first area.

22. The method of claim 20, wherein the provided information includes an indication of a status of the first area.

23. The method of claim 20, further comprising:
    selecting the location based service from a plurality of location based services based at least in part on the estimated location of the wireless device; and
    communicating, by the selected location based service, with the wireless device.

24. The method of claim 11, further comprising:
    estimating another location of another less device within the first area during a predefined time period.

25. The method of claim 11, further comprising:
    determining a target spatial resolution for the estimated location of the wireless device; and
    selecting a quantity of transmitters to be employed as the plurality of transmitters and selecting the defined location for the selected quantity of transmitters based at least in part on the determined target spatial resolution.

26. The method of claim 25, wherein the target spatial resolution is less than approximately 10 meters.

27. The method of claim 11, wherein the transmitters include Bluetooth compatible transmitters.

28. A non-transitory computer-readable medium having instruction stored thereon for causing a device to perform operations to estimate the location of a wireless device, the operations comprising:
    receiving, from a plurality of transmitters, respective sequences of digital values, wherein the sequences of digital values represent whether or not acknowledgements to respective inquiries from respective transmitters of the plurality of transmitters were received from the wireless device;
    generating averaged values for the sequences of digital values based at least in part on averaging the sequences of digital values; and
    estimating the location of the wireless device based at least in part on the averaged values.

29. The non-transitory computer-readable medium of claim 28, wherein said averaging the sequences of digital values is based at least in part on which of multiple power levels were employed by the transmitters for transmission of the inquires.

30. The non-transitory computer-readable medium of claim 28, wherein said estimating the location of the wireless device includes:
    estimating distances of the wireless device from the transmitters based at least in part on the generated averaged values.

31. The non-transitory computer-readable medium of claim 28, wherein the operations further comprise:
    providing the estimated location of the wireless device to a location based service.

32. The non-transitory computer-readable medium of claim 28, wherein said averaging the sequences of digital values includes low-pass filtering the sequences of digital values.

33. A system for estimating the location of a wireless device, comprising:
    means for receiving, from a plurality of transmitters, respective sequences of digital values, wherein the sequences of digital values represent whether or not acknowledgements to respective inquiries from respective transmitters of the plurality of transmitters were received from the wireless device;
    means for generating averaged values for the sequences of digital values based at least in part on averaging the sequences of digital values; and
    means for estimating the location of the wireless device based at least in part on the averaged values.

34. The system of claim 33, further comprising:
    means for providing the estimated location of the wireless device to a location based service.

35. The system of claim 33, wherein the means for generating averaged values includes:
    means for low-pass filtering the sequences of digital values.

* * * * *

UNITED STATES PATENT AND TRADEMARK OFFICE
CERTIFICATE OF CORRECTION

PATENT NO. : 8,145,235 B2
APPLICATION NO. : 11/917687
DATED : March 27, 2012
INVENTOR(S) : Titli et al.

It is certified that error appears in the above-identified patent and that said Letters Patent is hereby corrected as shown below:

On the Title Page, in Field (75), under "Inventors", in Column 1, Line 7, delete "Vestigne'" and insert -- Vestignè --, therefor.

On the Title Page, in the Figure, delete "  " and insert --  --, therefor.

In Fig. 1a, Sheet 1 of 2, delete "  " and insert --  --, therefor.

In Fig. 2, Sheet 2 of 2, delete "  " and insert --  --, therefor.

In Column 1, Line 13, delete "Article." and insert -- Article --, therefor.

In Column 9, Line 2, delete "111a," and insert -- 110a, --, therefor.

In Column 10, Line 55, delete "111a," and insert -- 110a, --, therefor.

In Column 11, Line 36, delete "111a," and insert -- 110a, --, therefor.

In Column 16, Line 26, in Claim 16, delete "comprising" and insert -- comprising: --, therefor.

In Column 16, Line 32, in Claim 17, delete "art" and insert -- part --, therefor.

In Column 16, Line 59, in Claim 24, delete "less" and insert -- wireless --, therefor.

Signed and Sealed this
Fourth Day of September, 2012

David J. Kappos
*Director of the United States Patent and Trademark Office*